United States Patent [19]
Witkowski

[11] Patent Number: 4,884,537
[45] Date of Patent: Dec. 5, 1989

[54] ROTARY INTERNAL COMBUSTION ENGINE

[75] Inventor: Jan Witkowski, New Britain, Conn.

[73] Assignee: Raul Castells, Miami, Fla. ; a part interest

[21] Appl. No.: 157,587

[22] Filed: Feb. 19, 1988

[51] Int. Cl.⁴ .............................................. F02B 53/00
[52] U.S. Cl. .................... 123/248; 418/111; 418/248
[58] Field of Search ................ 123/244, 248; 418/111, 418/248

[56] References Cited

U.S. PATENT DOCUMENTS

| | | | |
|---|---|---|---|
| 1,174,632 | 3/1916 | Snyder | 123/244 |
| 1,307,282 | 6/1919 | Ward | 418/248 X |
| 1,796,535 | 3/1931 | Rolaff | 418/111 |
| 3,978,825 | 9/1976 | Rogers | 123/244 |
| 4,618,318 | 10/1986 | Hansen | 418/111 |

FOREIGN PATENT DOCUMENTS

| | | | |
|---|---|---|---|
| 29650 | 5/1925 | France | 123/237 |
| 52277 | 3/1933 | Norway | 418/111 |

Primary Examiner—Michael Koczo
Attorney, Agent, or Firm—Bachman & LaPointe

[57] ABSTRACT

A rotary internal combustion engine is disclosed having a rotor which includes at least one fuel peripheral cavity. The rotor effects a valve action with respect to fuel inlet and exhaust ports. A rotor housing includes a circumferential array of piston - cylinder assemblies cooperating with the fuel cavity and with the rotor for compressing fuel mixture and exhausting products of combustion. The engine includes at least four separate seal arrangements for confining compressed fuel to the combustion chamber and a method of effecting the seals.

7 Claims, 9 Drawing Sheets

ROTARY INTERNAL COMBUSTION ENGINE

BACKGROUND OF THE INVENTION

This invention relates to rotary internal combustion engines and relates in particular to those engines whose cycle of operation simulates the classic four stroke cycle of a typical reciprocating piston-crank shaft engine.

Typical prior art engines over which the present invention is an improvement are shown and described in U.S. Pat. Nos. 1,287,277 issued Dec. 10, 1918 to Foster, 4,638,776 issued Jan. 27, 1987 to Crittenden and 4,653,438 issued March 31, 1987 to Russell.

In the '277 patent a plurality of rings N and $C_2$ seal combustion chambers F—F.

The '776 reference shows a compression chamber 23 separate and offset from a combustion chamber 25 and the '438 patent shows a cylindrical rotor having a plurality of radially extending piston - cylinder assemblies.

SUMMARY OF THE PRESENT INVENTION

In contrast, the present invention is directed to an improved rotary internal combustion engine having novel cooperation between a rotor and a series of piston means.

The engine is known as the JANWIT TM rotary engine.

A principal feature of the engine is a novel geometric layout facilitating cooperation between a plurality of piston means and a rotor.

A further feature of the invention is the provision of novel seal means between a piston means and the rotor for isolating a combustion chamber.

It is a further feature of the invention to provide an engine of the class described which is free of the classic piston rings.

A further feature of the invention is the provision of at least four separate seal means for maximizing the products of combustion to provide maximum thrust or torque in the rotor.

A still further feature of the invention is the provision of a novel reciprocating member or piston means incorporating a plurality of seal means for compressing intake fuel with a minimum of "blow back" during a compression stroke and during exhaust stroke.

A further feature of the invention is the provision of at least one cavity on the periphery of a rotor having a contoured surface complementing a working surface on a piston means reciprocating in a recess or cylinder means in a rotor housing to create a seal between the contoured surface and the working surface.

A further feature of the invention is the provision of a seal between the piston means and the rotor housing defining a prism composed of a plurality of prismatic or wedge-like piece parts.

A further feature of the invention is the provision of a novel arrangement of the several piston means piece parts effective to swell the parts to create a fluid tight seal between the piston means and the rotor housing.

A still further feature of the invention is the provision of a floating fuel cavity including a number of seal means effective to insure compression of fuel mixture prior to ignition and to insure maximum thrust after ignition.

Another feature of the invention is the provision of an operative fuel compression ratio.

A further feature of the invention is the provision of an auxiliary cam control means for enhancing the integrity of the seal means during the course of compression, ignition and exhaust.

A still further feature of the invention is the provision of a marginal cut-out or slot in the piston means to facilitate transfer of fuel mixture to the compression chamber during the course of the compression stroke.

A further feature of the present invention is the provision of a "pancake" shaped engine which lends itself to adaptation to vehicles which have limited space requirements.

A still further feature of the invention is the provision of a relatively small flat engine developing a relatively high degree of torque by virtue of the length of its lever arm (radius of rotor) measured from the axis about which the rotor rotates to the peripheral location of each combustion chamber.

That is, torque can be changed by merely selecting the appropriate length of the lever arm W.

A further feature of the invention is the provision of a rotary engine having a plurality of combustion chambers each having a operating cycle comprising compression, ignition and exhaust.

While the disclosed embodiment of the invention shows piston means of a generally rectangular configuration in cross section, it is entirely within the spirit and scope of the invention to utilize, piston means of circular, elliptical, polygonal or irregular cross section. Obviously the cross sectional configuration of the rotor housing recesses or cylinder means must complement the cross section of the piston means.

A further feature of the present invention is the provision of an internal combustion engine which is free of valves, valve stems, valve seats and piston rings normally present in the classic internal combustion engine.

A further feature of the present invention is that it lends itself readily to air or liquid cooling.

A further feature of the invention resides in the fact that the fuel inlet ports and the exhaust ports are spaced a substantial distance from one another providing efficient purging of exhaust gases.

An internal combustion engine assembly embracing certain features of the present invention may comprise a central rotor means formed with at least one peripheral cavity, said cavity having a first surface defining a thrust surface and a second surface defining a contoured surface, a fixed rotor housing means having opposed flat side walls and a circular internal wall, said internal wall being intercepted by a circumferential array of radially disposed recesses defining cylinder means, said housing means and said rotor means being relatively rotatable, a piston means individual to each recess and reciprocable therein, each piston means having a working surface complementary to said contoured surface, power means for urging said working surface into areal contact with said contoured surface, said housing means having at least one fuel inlet port, at least one fuel ignition means and at least one exhaust port whereby during the course of a partial revolution of the rotor means relative to the housing means, the piston means, the power means, the respective ports, the ignition means and the cavity cooperate to develop, fuel compression, fuel ignition and exhaust functions.

A novel method of effecting a seal means between a piston means and a cylinder means embracing certain other features of the invention may comprise the steps of providing a cylinder means having an internal wall structure, providing a piston means operable to reciprocate within said cylinder means, dividing the piston means into a plurality of solid segments, urging a first pair of segments resiliently in opposite directions along a first axis into frictional contact with said wall structure of said cylinder means, and urging a second pair of segments resiliently in opposite directions along a second axis into frictional contact with said cylinder structure.

Other features and advantages of the present invention will become more apparent from an examination of the succeeding specification when read in conjunction with the appended drawings in which;

BRIEF DESCRIPTION OF THE DRAWINGS

FIG. 9 is a vertical section of FIG. 8 in the plane of the line 9—9 as viewed in the direction of the arrows;

DETAIL DESCRIPTION OF THE PREFERRED EMBODIMENT

Figure 1:
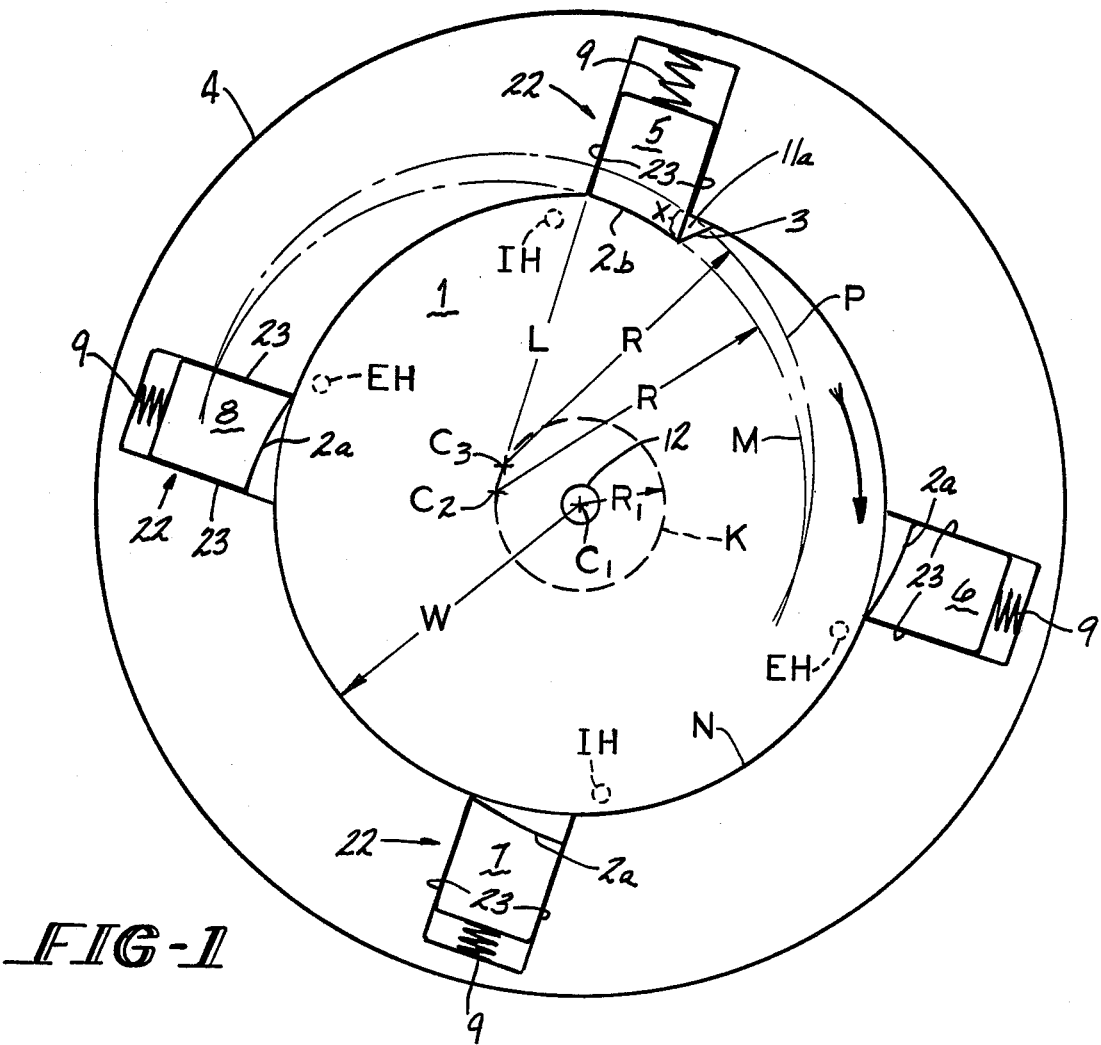
FIG. 1 is a geometric layout showing the principle forming the basis of design of the rotor, the fuel cavity, the compression chamber, the piston means, its stroke and a portion of the rotor housing.
Figure 2:
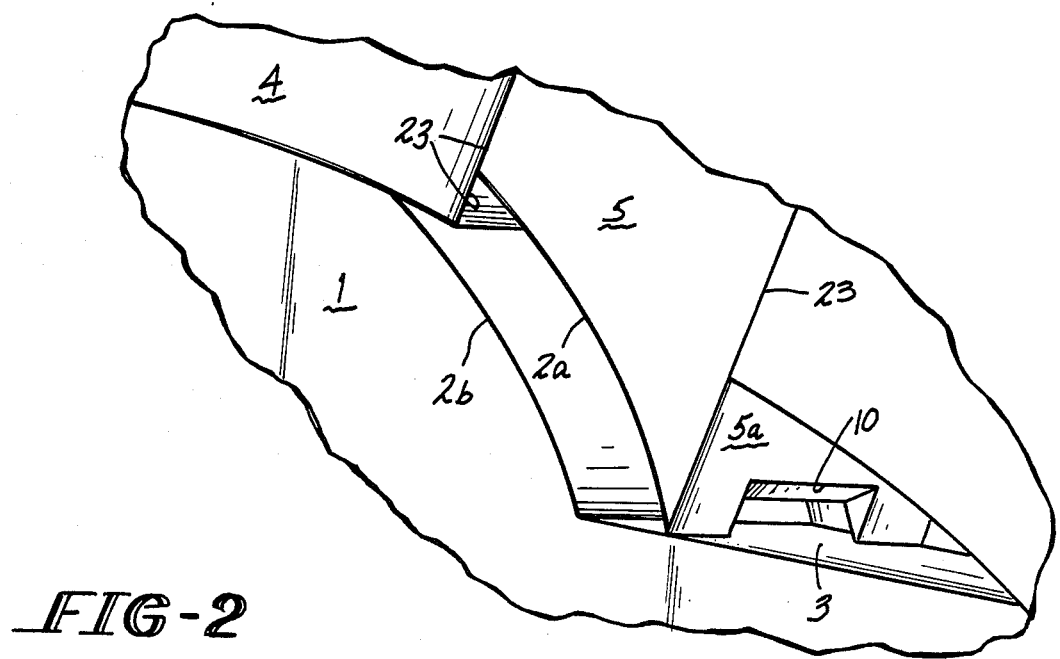
FIG. 2 is a perspective view, enlarged, of a portion of the rotor and of the piston means including its cut-out or slot facilitating transfer of compressed fuel into the compression chamber.
Figure 3:
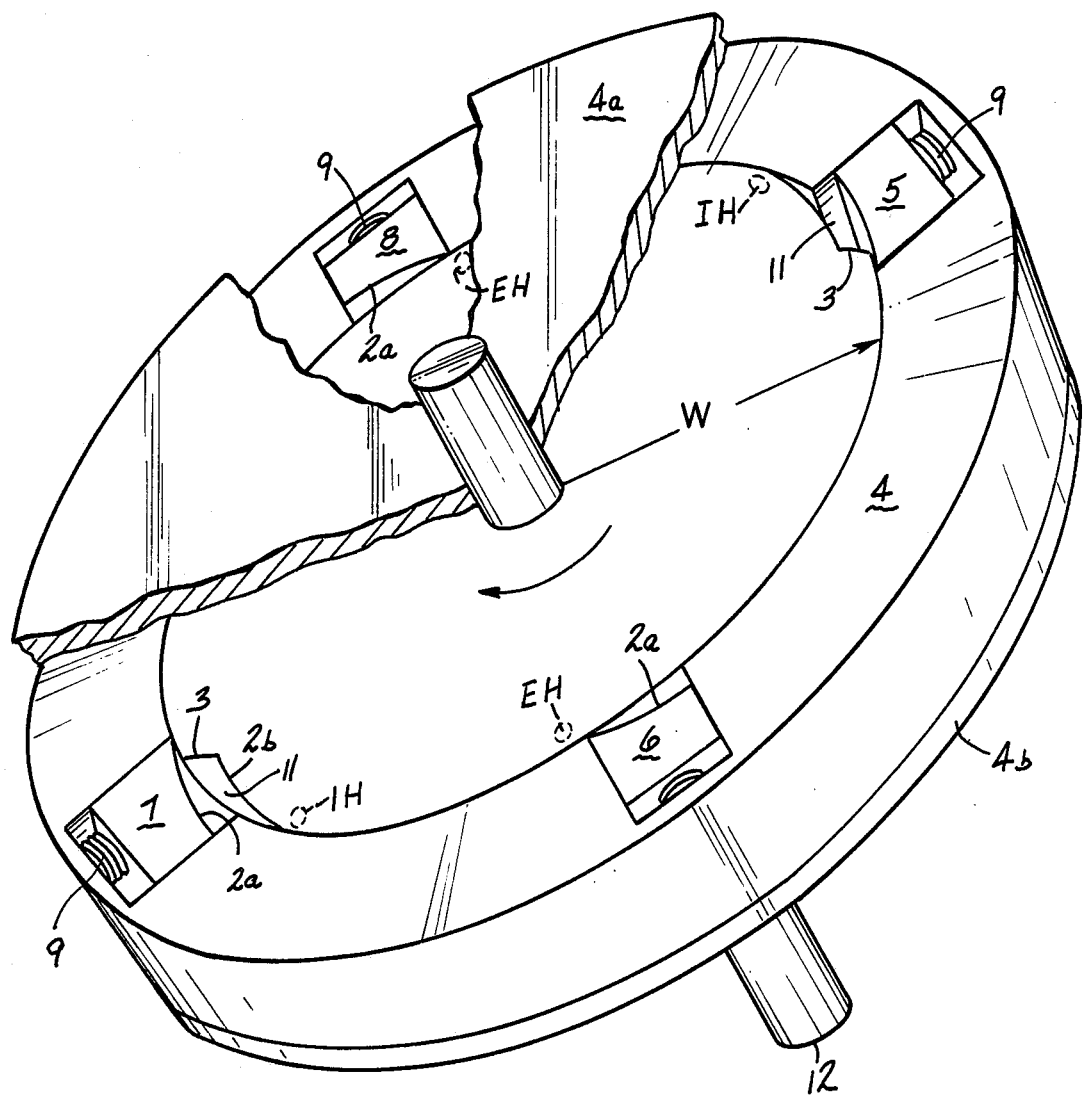
FIG. 3 is a perspective view of the assembled rotor and housing with parts broken away for clarity.

Referring to FIGS. 1, 2, 3 and 4 a housing 4 formed with an array of radially disposed recesses or cylinder means 22 having parallel side walls 23 (defining a rectangle in cross-section) provide a receptacle for one piece, unitary piston means 5, 6, 7 and 8. The piston means, urged radially inwardly by power means defining springs 9, are each formed with an arcuate working face 2a which complements a mating surface defining a contoured surface 2b on rotor 1. When working face 2a is in areal contact with contoured surface 2b a first seal means is established. The body of each piston means 5, 6, 7, & 8 is in metal to metal sliding contact with the mating walls of respective cylinder means.

Both surfaces 2a and 2b have a radius R with offset centers $C_3$ and $C_2$, respectively.

At this juncture it is well to describe the geometric layout of FIG. 1 which: (1) facilitates the cooperation between the piston means and the rotor; (2) develops the stroke and line of motion of the piston means and (3) illustrates the basic principles upon the rotary engine of the present invention is designed.

W represents the radius (lever arm) of the rotor 1 having a center $C_1$. A circle K, shown in dashed lines, having a radius $R_1$, is circumscribed about center $C_1$.

Center $C_2$ is a point on the circumference of circle K. Center $C_2$ is selected in combination with the selection of radii R and $R_1$ so that one can swing an arc M of radius R which intercepts the circle N generated by the rotor radius W. This occurence establishes the contoured surface 2b on the rotor 1.

To establish stroke X of the piston means and to generate a mating working face 2a on the piston means a center $C_3$ is selected on the periphery of circle K from which an arc P having a radius R is struck. Centers $C_2$ and $C_3$ are then joined to create line L which establishes the line of motion of the piston means. The distance between centers $C_2$ and $C_3$ establishes stroke X of the piston means.

The selection of radii W, R & $R_1$ as well as the location of Centers $C_2$ and $C_3$ are matters of design choice depending upon the torque, compression ratio, stroke and overall engine size desired.

Figure 4:
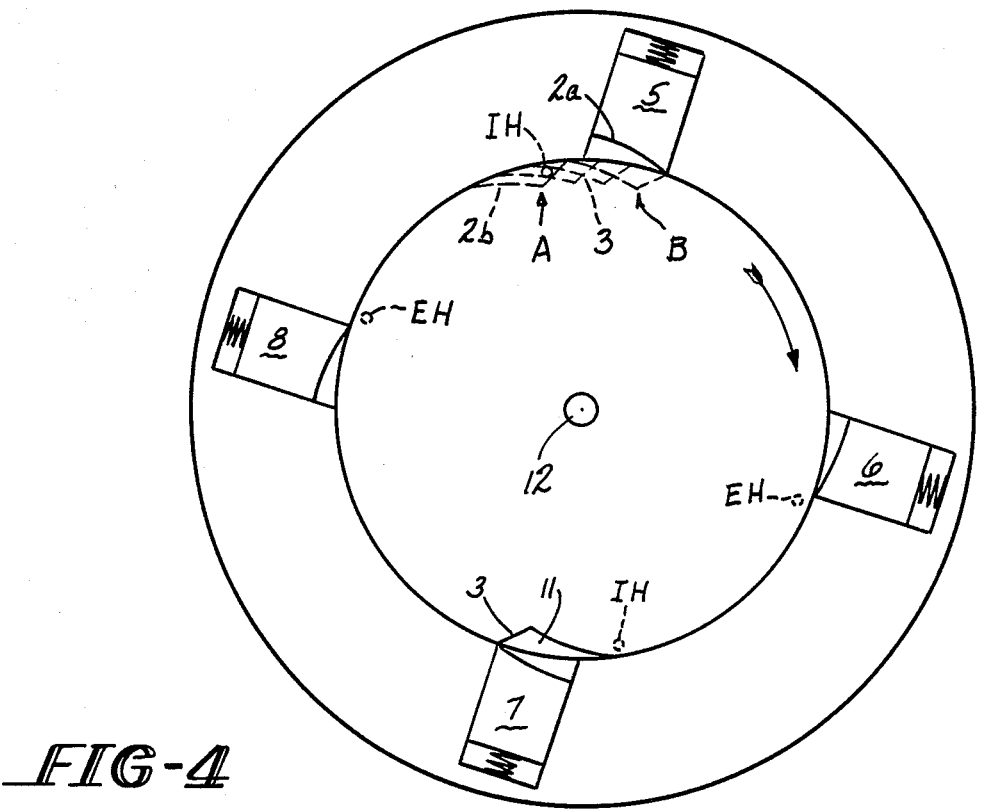
FIG. 4 is a schematic plan view of the one of the rotor's peripheral cavities in transit past a fuel inlet port with a piston means poised to complete a fuel compression stroke.

As is more apparent in FIG. 4, the contoured or arcurate surface 2b on the rotor 1 in combination with straight wall 3 define a fuel cavity 11. As will be more apparent as the specification proceeds, the wall 3 also represents the power or thrust surface (see FIG. 2) against which the products of combustion or combustion gases operate to drive the rotor clockwise upon ignition of fuel compressed by piston means such as, for example, piston means 5. The slant of the thrust surface 3 is not critical and is a further matter of design choice.

Figure 5:
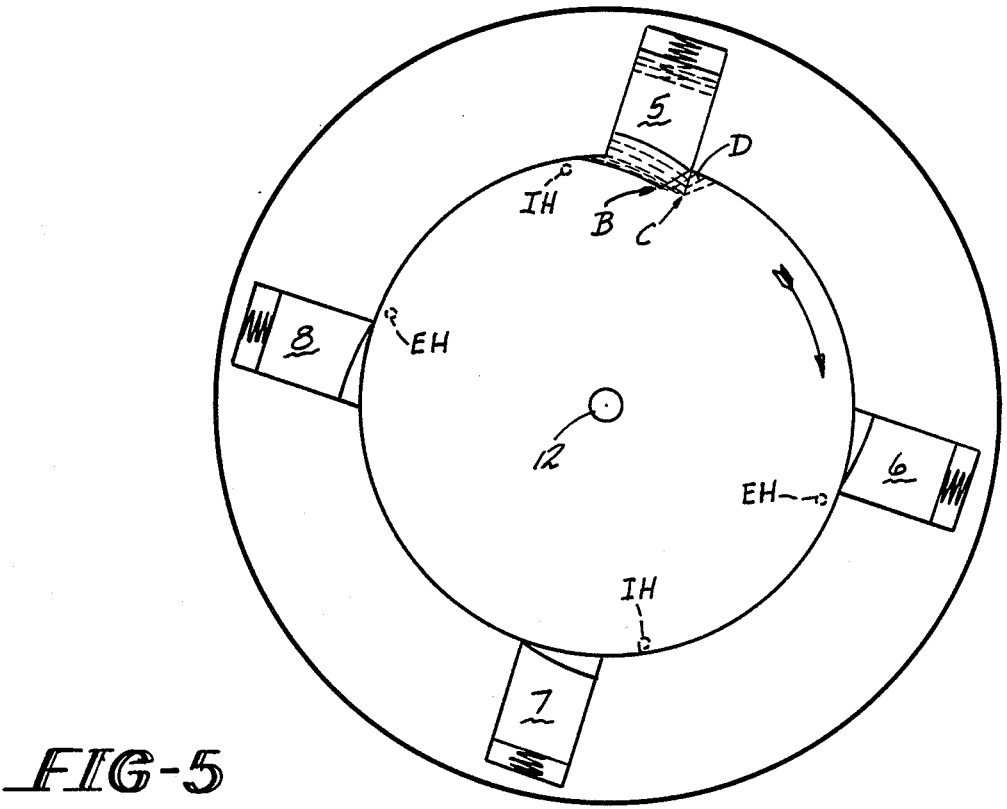
FIG. 5 is a continuation of the illustration of FIG. 4 showing completion of the compression stroke with fuel confined to the compression chamber at the instant of ignition.
Figure 6:
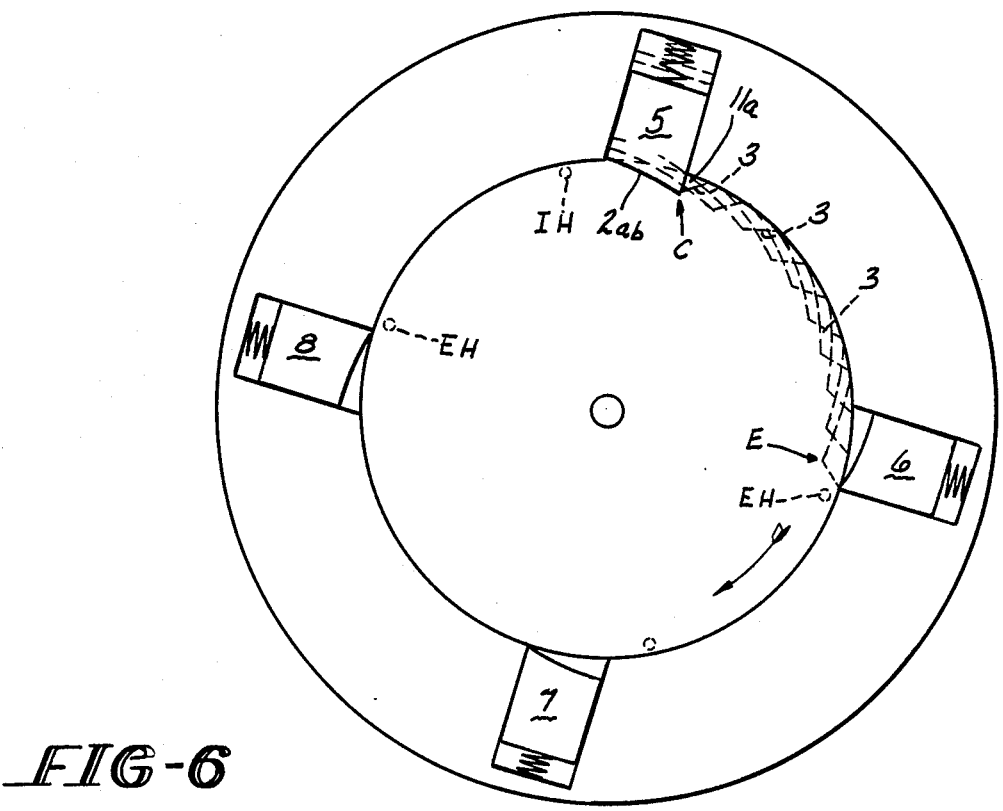
FIG. 6 shows further progression of the rotor after the power thrust with the rotor approaching an exhaust port.

At the instant when the working face 2a of a piston means (such piston means 5 in FIG. 5) falls into register with and in face to face areal contact with mating contoured surface 2b of rotor 1, at the point indicated by the letter C, a combustion chamber D (11a in FIG. 1) is established bounded by a portion 5a (FIG. 2) of a side wall of the piston means 5 and the thrust surface 3.

In order to enhance and facilitate flow of fuel mixture into the combustion chamber during the compression stroke of piston means 5 a slot or cut-out 10 is formed in the piston means (See FIG. 2) which, upon completion of the compression stroke, becomes an extension or an addition to the combustion chamber D.

Housing 4 is formed with two fuel inlet ports IH and two exhaust ports EH.

The ports are normally closed by the main body of the rotor and open as the fuel cavity 11 wipes past the ports and falls into instantaneous register with the port as shown in FIG. 4. The exhaust port EH operates in the same fashion.

Thus, in the disclosed embodiment of the invention, the piston means 5 and 7 involve the functions of, fuel compression and fuel ignition while the alternate piston means 6 and 8 involve the exhaust function. As is most apparent in FIGS. 3 and 4 a second fuel cavity 11 cooperates with piston means 7 and with adjacent fuel inlet and exhaust ports in similar fashion.

While the disclosed embodiment of the invention shows only two fuel cavities 11, two fuel inlet ports, two exhaust ports and four piston means, it is entirely within the spirit and scope of the invention to provide additional fuel cavities and additional fuel inlet and exhaust ports and additional piston means as power requirements and other design consideration dictate.

Correspondingly, the radius of the rotor, the size and number of fuel cavities and piston means which bear upon the engine efficiency are matters of choice consistent with space, torque requirements and sound engineering.

Compression piston means 5 and 7 reciprocate along a path parallel to the line L as shown in the layout of FIG. 1, while exhaust piston means 6 and 8 reciprocate along a path generally perpendicular to line L.

Figure 7:
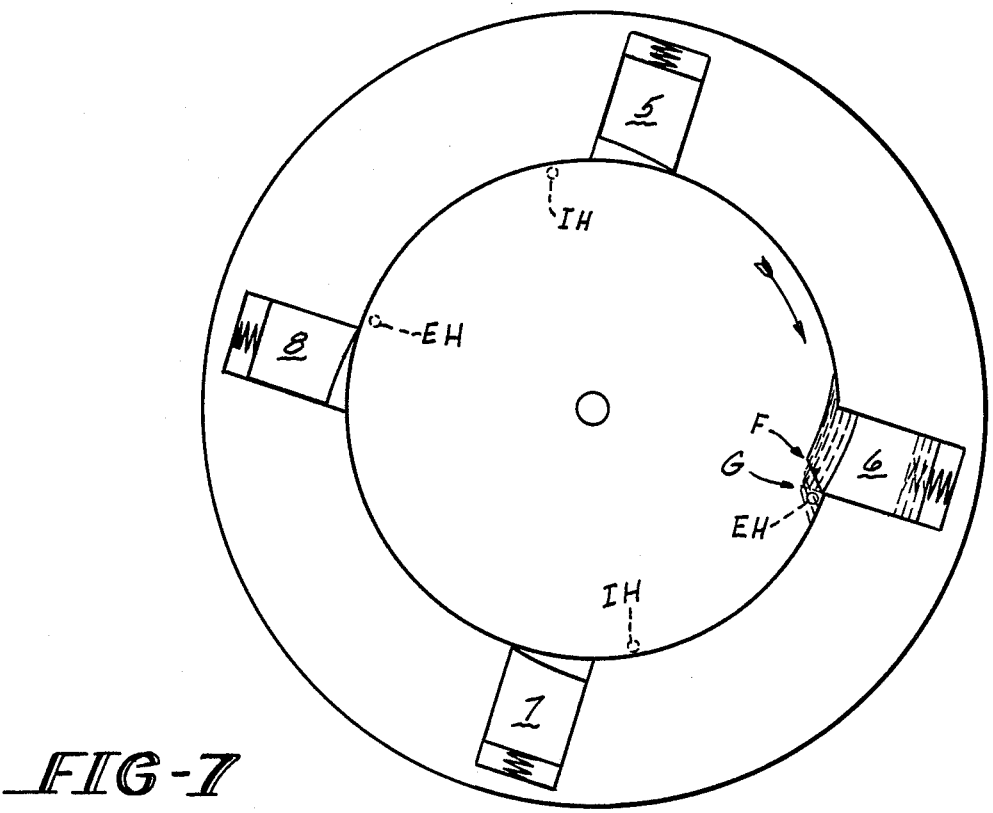
FIG. 7 shows the exhaust port open and a piston means moving into the fuel cavity to purge the cavity of exhaust gases.

In FIGS. 4 through 7 the letters A through G represent progressive instantaneous positions of the fuel cavity 11 as the rotor rotates relative to housing 4 from position A, in register with fuel inlet port IH FIG. 4, to a position G, in register with exhaust port EH, FIG. 7.

Figure 8:
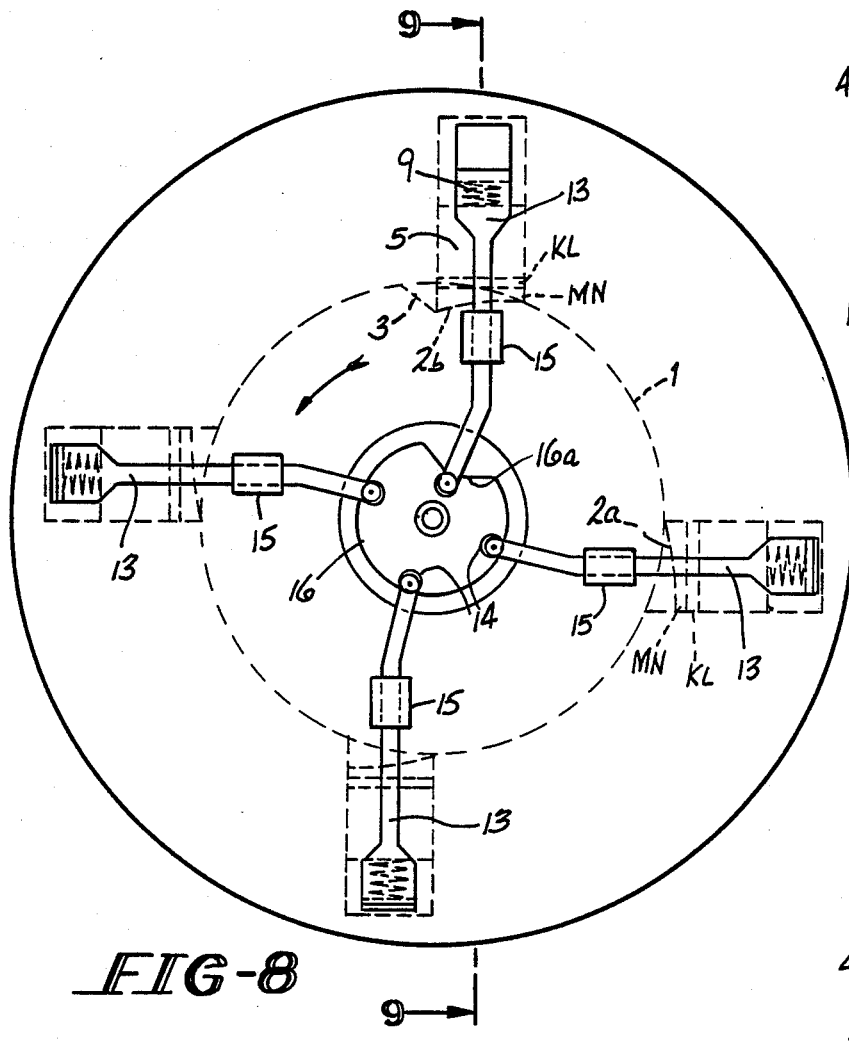
FIGS. 8 and 9 show, schematically, the auxiliary cam and follower arrangement for enhancing the integrity of the piston means seal (first seal means) during the instance of ignition.
Figure 9:
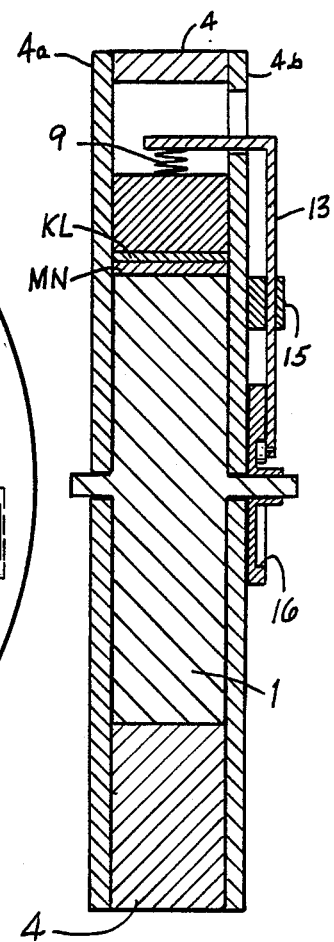

FIGS. 8 and 9 show details of an optional cam means for enhancing the thrust of power means or coil spring 9. Note that FIG. 8 shows the back side of the layout of FIG. 1.

A cam ring 16 fixed to the rotor 1 having a lobe 16a cooperates with cam followers 14. The location of lobe 16a is phased relative to the completion of the compression stroke so as to add additional instantaneous thrust or "back up" to the compression stroke to enhance the first seal (between surfaces 2a and 2b) and to maintain compression at the instant of ignition.

The followers 14 each connected to an L shaped arm 13, bracketed slidably in guides 15, terminate in a connection with coil spring 9.

Referring to FIGS. 10, 11, 12 and 13 details of a modified piston means are disclosed. Since all modified pistons means are of the same configuration only one will be described in detail.

Basically each modified piston means includes a generally prism-like configuration (See FIGS. 10 and 11) and is composed of a plurality of wedge-like, segments or piece parts K, L, M and N.

A first pair of piece parts M and N, aligned by and free to slide on dowel 17a are urged outwardly by spring 20a against the interior side walls 23 (FIG. 1) of recess or cylinder means 22.

Figure 10:
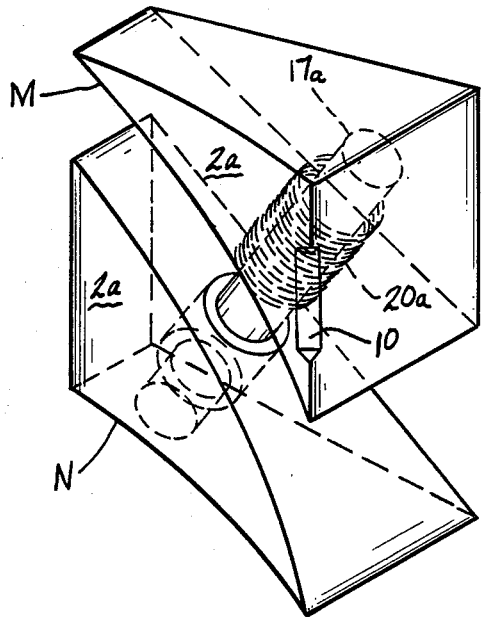
FIGS. 10 and 11 show details of the prismatic piece parts (second seal means) which, in assembly, define an alternative piston means.
Figure 11:
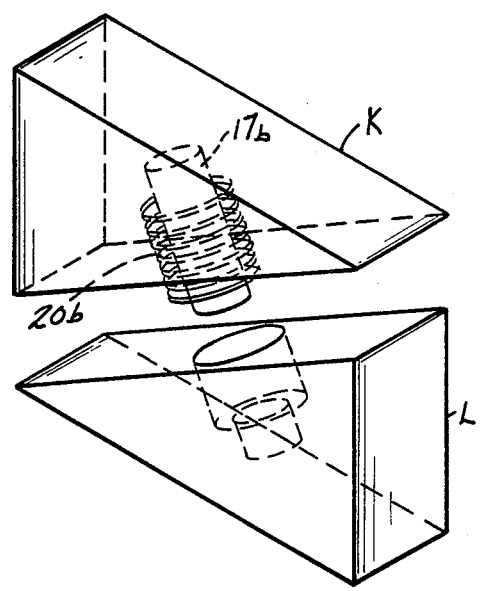
Figure 12:
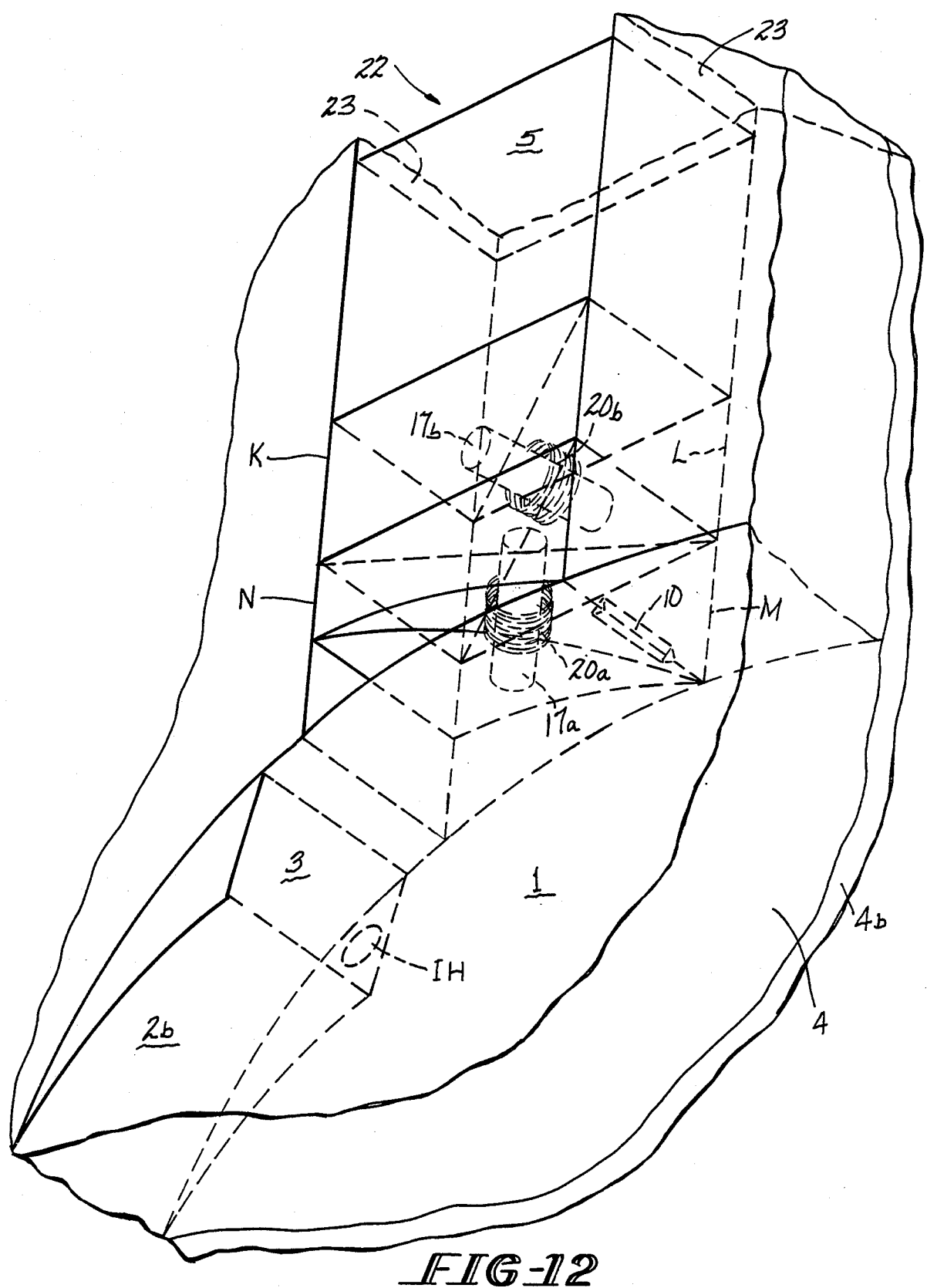
FIGS. 12 and 13 show schematically the alternative piston means assembled and "exploded", respectively, to show structure and operation of the prismatic segments or piece parts of the alternative piston means.
Figure 13:
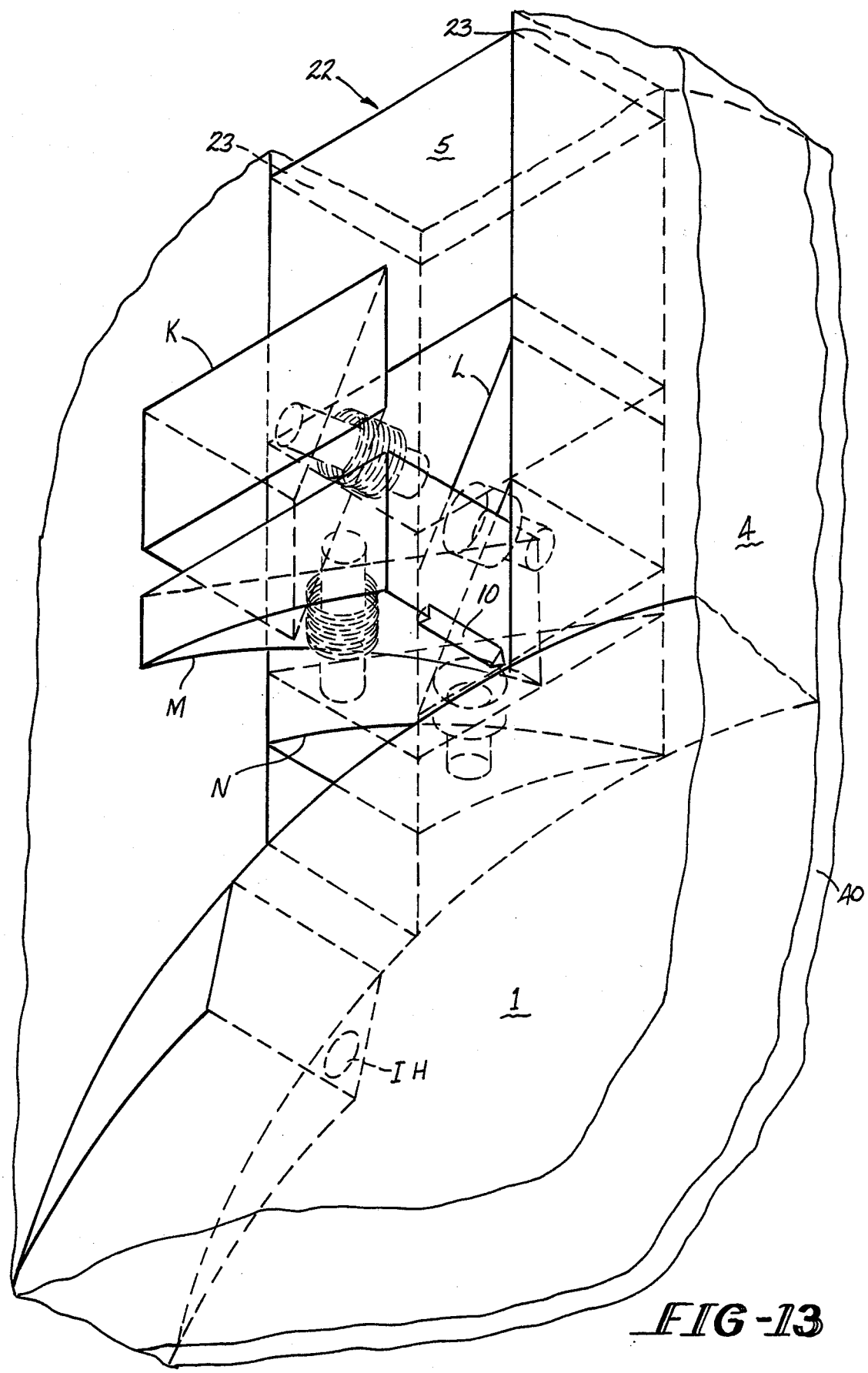

The assembled segments M and N together form working face 2a and the single segment M includes fuel transfer slot or cut-out 10 as is most apparent in FIG. 10.

Stacked above and radially outward of the first pair of segments M-N, a second pair of segments K-L, aligned by and free to slide on dowel 17b, are urged by spring 20b against diametrically opposed side walls of cylinder means 22. These side walls are designated by the reference numerals 4a and 4b of housing 4 as shown in FIG. 9.

Since the dowels 17a and 17b are generally perpendicular to one another, when the segments K, L, M and N are assembled in their mating cylinder means, the swelling effect created by the springs 20a and 20b create a fluid seal between the composite piston means 5 and the cylinder means 22 functioning in much the same fashion as the seal that is created by conventional piston rings. For purposes of claiming the invention the segments K, L, M & N are referred to as a second seal means.

As stated previously, while the piston and cylinder means of the present disclosure are of rectangular cross-section it is entirely within the spirit and scope of the invention to make the cross-sections circular, elliptical or of any reasonable polygonal or irregular configuration.

Figure 14:
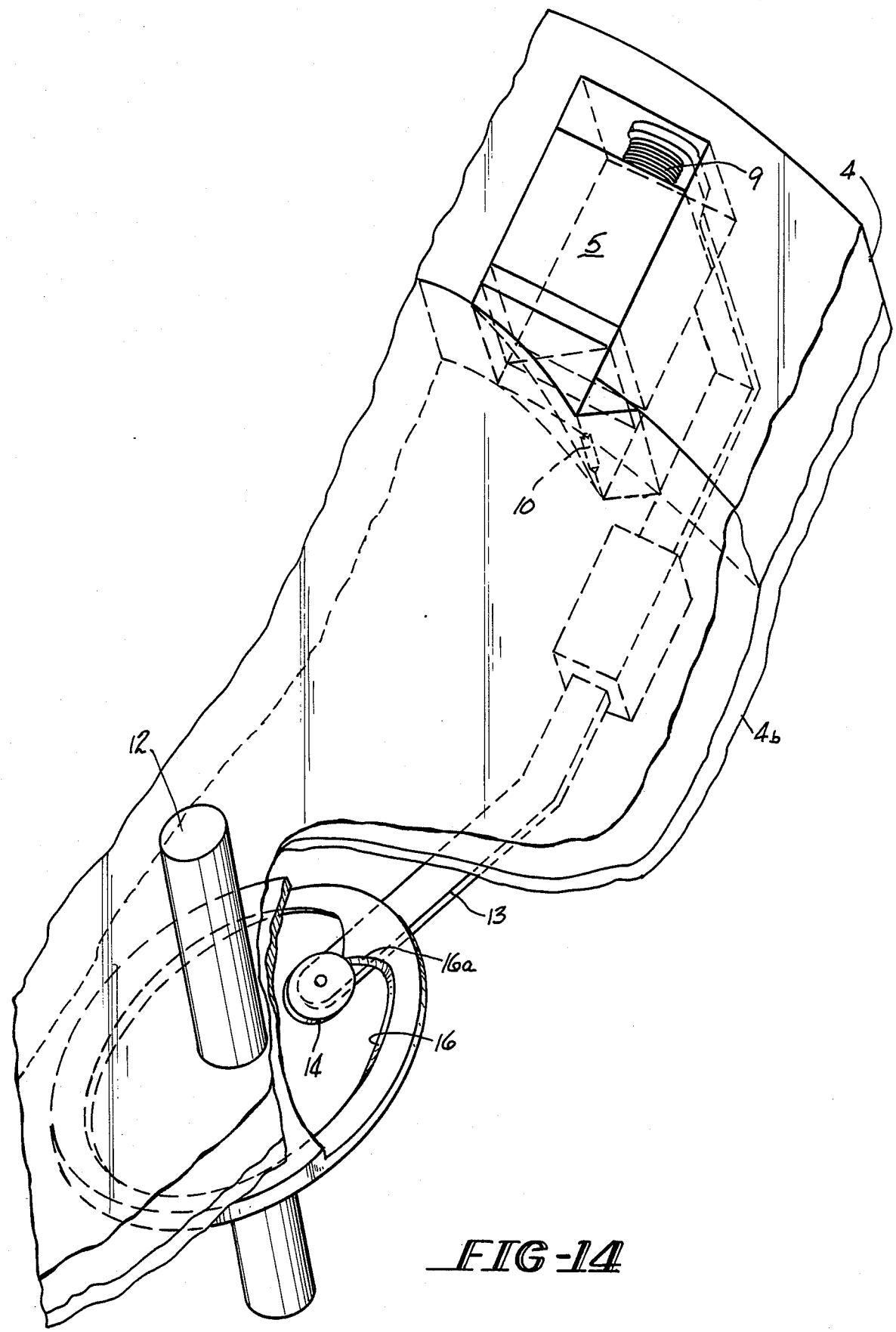
FIG. 14 is a perspective view of a portion of the exterior of the rotor housing showing a piston means and cooperating cam means at peak fuel compression.

FIG. 14 is a partial view of the front side of the rotor 1, housing 4, piston 5, fuel passage cut-out 10, in phantom, showing in great detail the cooperation between cam ring 16, follower 14 and the lobe 16a at the peak of compression just prior to ignition.

Figure 15:
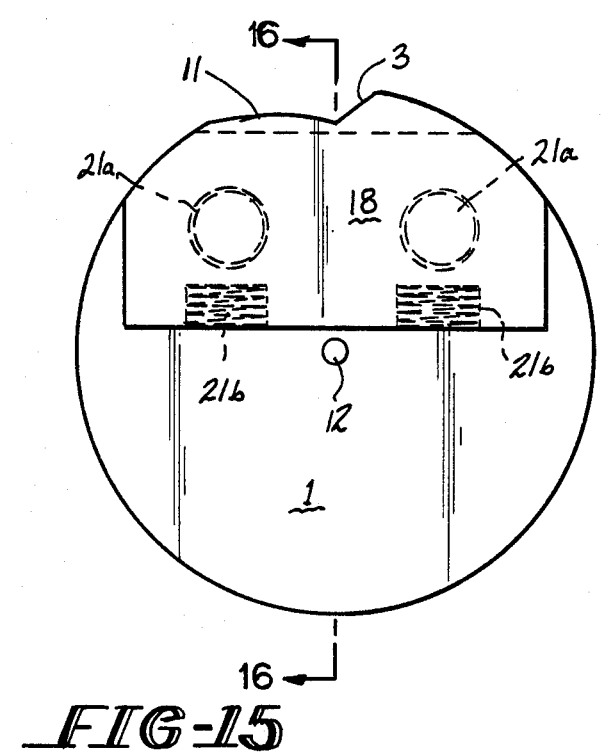
FIGS. 15, 16 and 17 show schematically the structure and operation of the third and fourth seal means of a floating rotor fuel cavity.
Figure 16:
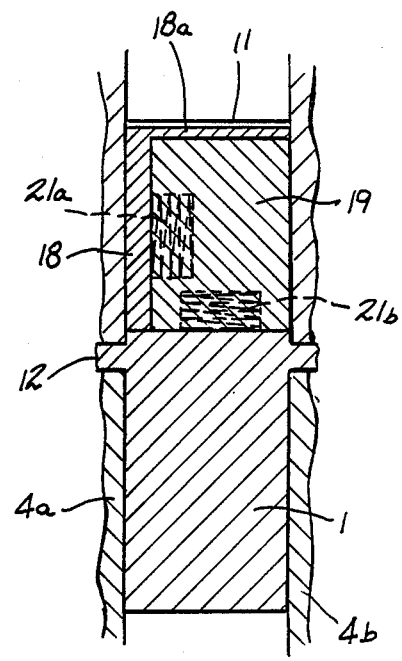
Figure 17:
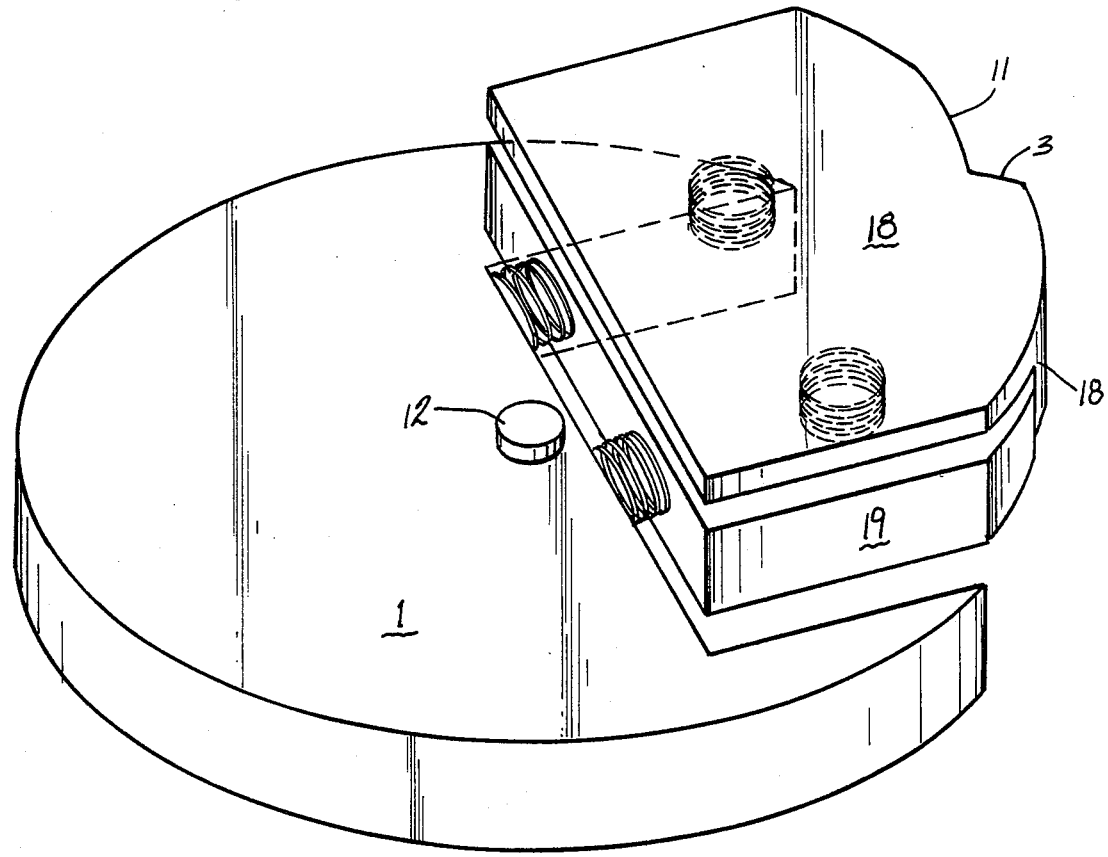

FIGS. 15, 16 and 17 show the details of a third and fourth seal means wherein a portion of the rotor 1 which includes the fuel cavity 11 is sealed against the flat side walls 4a and 4b (third seal means) and against the internal circular surface or race 4c (fourth seal means) of the housing 4 between recesses or cylinder means. Coil springs 21a—21a thrust the L shaped plate 18 and the flat plate 19 outwardly against the respective flat side walls 4a and 4b of the housing 4 to create the third seal means. Corresponding coil springs 21b thrust the top portion 18a of L shaped plate 18 against the inner surface 4c of the housing 4 to effect the fourth seal means. This modification creates a "floating" fuel cavity 11.

OPERATION

Assume that air or air/fuel mixture supplied to an inlet port IH by means not shown and that the rotor is cranked in a clockwise direction until the fuel cavity 11 falls into register with the fuel inlet port. During this occurrence a piston means 5 begins a compression stroke under the influence of power spring 9. The addition of the cam and follower means 16 and 14 is a matter of choice depending upon materials selected for fabricating the rotor and the piston means.

When the compression stroke is completed and the fuel is compressed into the combustion chamber D, a timed spark ignites the compressed fuel. Expansion of combustion gases create a pressure upon thrust surface 3 driving the rotor clockwise until the fuel cavity 11 uncovers the exhaust port EH whereupon the cavity 11 is purged of exhaust gases by action of piston means 6.

Fly wheel effect casts the rotor further about its axis or shaft 12 until a second fuel inlet port IH (FIGS. 3 and 4) is uncovered and the process just described is repeated. The first, second, third and fourth seal means being operative to confine the gaseous products of ignition to create the maximum thrust or torque upon the various thrust surfaces in sequence.

While the disclosed engine parts are fabricated of metal it is entirely within the scope of the invention to fabricate some or all of the parts from plastic or ceramic materials to coat some or all of the parts with plastic or ceramic coatings.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An internal combustion engine assembly comprising:
   a central rotor means formed with at least one peripheral fuel cavity,
   said cavity having a first surface defining a thrust surface and a second surface defining a contoured surface,
   a housing means enclosing said rotor and having an internal wall encircling said rotor,
   said internal wall being intercepted by at least two recesses defining cylinder means,
   said housing means and said rotor means being relatively rotatable,
   piston means individual to each said cylinder means and reciprocable therein,
   each piston means having a working face complementary to said contoured surface,
   power means for urging said working face into intimate areal contact with said contoured surface to create a first seal means,
   said housing means having at least one fuel inlet port, at least one fuel ignition means and at least one exhaust port whereby during the course of a revolution of the rotor means relative to the housing means, the first seal means, the power means, the respective ports, the ignition means and the fuel cavity cooperate to develop fuel compression, fuel ignition and exhaust functions,
   said piston means including a plurality of cooperating piece parts defining a second seal means,
   a first pair of piece parts including a first power means tending to separate said first pair of piece parts along a first axis to urge said piece parts into frictional contact with said cylinder means, and,
   a second pair of piece parts including a second power means tending to separate said second pair of piece parts along a second axis to urge said piece parts into frictional contact with said cylinder means.

2. The engine assembly of claim 1 in which the rotor is formed with two fuel cavities and the housing means is formed with four cylinder means, each cylinder means having a piston means individual thereto whereby alternate piston means compress fuel and intervening piston means discharge exhaust gases.

3. The engine assembly of claim 1 in which a fuel inlet port is positioned in said housing means adjacent a first piston means and an exhaust port is positioned adjacent a second piston means.

4. The engine assembly of claim 1 in which the housing means, rotor means and the piston means are fabricated from metallic materials and the piston means and the cylinder means are in sliding, metal to metal contact.

5. The engine assembly of claim 1 in which said first and second pairs of piece parts, respectively, are joined by guide pins.

6. The engine assembly of claim 1 in which the power means includes a spring means.

7. An internal combustion engine assembly comprising:
   a central rotor means formed with at least one peripheral fuel cavity,
   said cavity having a first surface defining a thrust surface and a second surface defining a contoured surface,
   a housing means enclosing said rotor and having an internal wall encircling said rotor,
   said internal wall being intercepted by at least two recesses defining cylinder means,
   said housing means and said rotor means being relatively rotatable,
   piston means individual to each said cylinder means and reciprocable therein,
   each piston means having a working face complementary to said contoured surface,
   power means for urging said working face into intimate areal contact with said contoured surface to create a first seal means,
   said housing means having at least one fuel inlet port, at least one fuel ignition means and at least one exhaust port whereby during the course of a revolution of the rotor means relative to the housing means, the first seal means, the power means, the respective ports, the ignition means and the fuel cavity cooperate to develop fuel compression, fuel ignition and exhaust functions,
   the configuration of said fuel cavity being such that when the working face of a piston means and the contoured surface of the rotor are in face to face areal contact, at the end of a compression stroke, a portion of the piston means, the thrust surface and the housing means walls define a combustion chamber, and,
   said portion of said piston means being formed with a cut-out or slot to facilitate flow of compressed fuel into said combustion chamber, said cut-out defining an extension of said combustion chamber.

* * * * *